United States Patent [19]

Cavil et al.

[11] 4,074,669
[45] Feb. 21, 1978

[54] ROTOR CONTROLLED AUTOMATIC SPARK ADVANCE

[75] Inventors: David T. Cavil, Menomonee Falls, Wis.; Einar T. Hansen, Galesburg, Ill.; Henry J. Schmidt, Menomonee Falls, Wis.

[73] Assignee: Outboard Marine Corporation, Waukegan, Ill.

[21] Appl. No.: 755,179

[22] Filed: Dec. 29, 1976

Related U.S. Application Data

[63] Continuation of Ser. No. 551,087, Feb. 20, 1975, abandoned.

[51] Int. Cl.² .............................................. F02D 3/06
[52] U.S. Cl. ......................... 123/148 CC; 123/149 C; 310/153; 315/218
[58] Field of Search ........ 123/148 CC, 149 R, 149 C, 123/149 D, 146.5 A; 310/70 R, 70 A, 153; 315/218

[56] References Cited

U.S. PATENT DOCUMENTS

| 3,398,353 | 8/1968 | Noddin et al. | 123/148 E X |
| 3,527,266 | 9/1970 | Santi | 123/149 D |
| 3,554,179 | 1/1971 | Burson | 123/149 |
| 3,599,615 | 8/1971 | Foreman et al. | 123/149 C X |
| 3,667,441 | 6/1972 | Cavil | 123/148 E |
| 3,809,040 | 5/1974 | Burson et al. | 123/149 D X |

FOREIGN PATENT DOCUMENTS

1,909,143  11/1970  Germany .................... 123/148 CC

Primary Examiner—Charles J. Myhre
Assistant Examiner—Tony M. Argenbright
Attorney, Agent, or Firm—Michael, Best & Friedrich

[57] ABSTRACT

Disclosed herein is an ignition system comprising a coil mounted on a core having first and second spaced legs, together with a rotor mounted for rotation, under normal operating conditions, in one direction relative to the core such that any point on the periphery of the rotor passes the first leg prior to the second leg. The rotor includes a magnet having arcuately spaced first and second poles and first and second pole shoes extending respectively from the first and second poles. In addition, the first pole shoe extends in spaced relation from the second pole shoe in the direction of normal rotor rotation and has an arcuate length which is greater than the spacing of the first and second legs, and is effective, incident to travel of the first pole shoe past the first and second legs, to cause initial flow of flux of one direction into the coil core so as to generate in the coil a first current pulse of one polarity and thereafter to cause outflow of the flux from the coil core so as to generate in the coil a second pulse of the opposite polarity prior to approach of the second pole shoe to the first leg.

1 Claim, 3 Drawing Figures

ROTOR CONTROLLED AUTOMATIC SPARK ADVANCE

This is a continuation of application Ser. No. 551,087 filed Feb. 20, 1975, now abandoned.

BACKGROUND OF THE INVENTION

The invention relates generally to ignition systems for internal combustion engines, and more particularly to magneto powered capacitor discharge ignition systems. The invention also relates to ignition systems including means for automatically providing spark advance in response to increasing engine speed. One such prior ignition system is disclosed in the Cavil U.S. Pat. No. 3,667,441, issued June 6, 1972.

The invention also relates to ignition circuits including means for preventing reverse engine operation. One such prior ignition circuit is disclosed in the Donohue U.S. Pat. No. 3,795,235, issued Mar. 5, 1974.

SUMMARY OF THE INVENTION

The invention provides a method of operating an internal combustion engine ignition system to permit normal engine operation in a desired direction of rotation and to prevent engine operation in the direction of rotation reverse to the desired direction, which ignition system includes a capacitor adapted to be charged, a switch operative to discharge the capacitor, and relatively rotatable magnet and core parts adapted to charge the capacitor and to operate the switch, the core part having thereon a coil and including first and second legs and the magnet part having arcuately spaced first and second pole shoes with the first pole shoe extending in spaced relation from the second pole shoe in the direction of desired rotation and having an arcuate length which is greater than the spacing of the first and second legs of the core.

The method comprises the steps of rotating the magnet and core relative to each other to initially cause inflow of flux in one direction in the core to produce in the coil a first pulse which, when the engine is operating in the desired direction, is of the polarity which is ineffective to operate the switch and which, when the engine is operated in the reverse direction, is of the other polarity and of sufficient magnitude to operate the switch to discharge the capacitor so far in advance of top dead center so as to preclude continued reverse engine rotation, to thereafter cause outflow of flux in the opposite direction from the core to produce in the coil a second pulse which, when the engine is operating in the desired direction, is of the opposite polarity and of insufficient magnitude to operate the switch to cause discharge of the capacitor when the engine is operating at slow speed and of sufficient magnitude to operate the switch to discharge the capacitor when the engine is operating at high speed, to thereafter cause inflow of flux into the core so as to produce in the coil a third pulse which, when the engine is operating in the desired direction, is of the opposite polarity and is effective to operate the switch to discharge the capacitor when the engine is operating at slow speed, and to thereafter cause reversal of flux flow so as to produce in the coil a fourth pulse which, when the engine is operating in the desired direction, is of the polarity which is ineffective to operate the switch and which can be employed to charge the capacitor.

One of the principal features of the invention is the provision of a capacitor discharge ignition system in which automatic spark advance in response to increasing speed is provided in response to the arcuate length of at least one of a pair of pole shoes provided on a rotor.

Another of the principal features of the invention is the provision of a capacitor discharge ignition system in which reverse engine operation is prevented by reason of the arcuate length of at least one of a pair of pole shoes provided in the rotor.

Another of the principal features of the invention is the provision of a capacitor discharge ignition system which provides automatic spark advance in response to increasing engine speed and which prevents engine reverse operation by reason of the arcuate length of at least one of a pair of pole shoes incorporated in the rotor.

Other features and advantages of the invention will become known by reference to the following drawings, general description, and claims.

IN THE DRAWINGS

Figure 1:
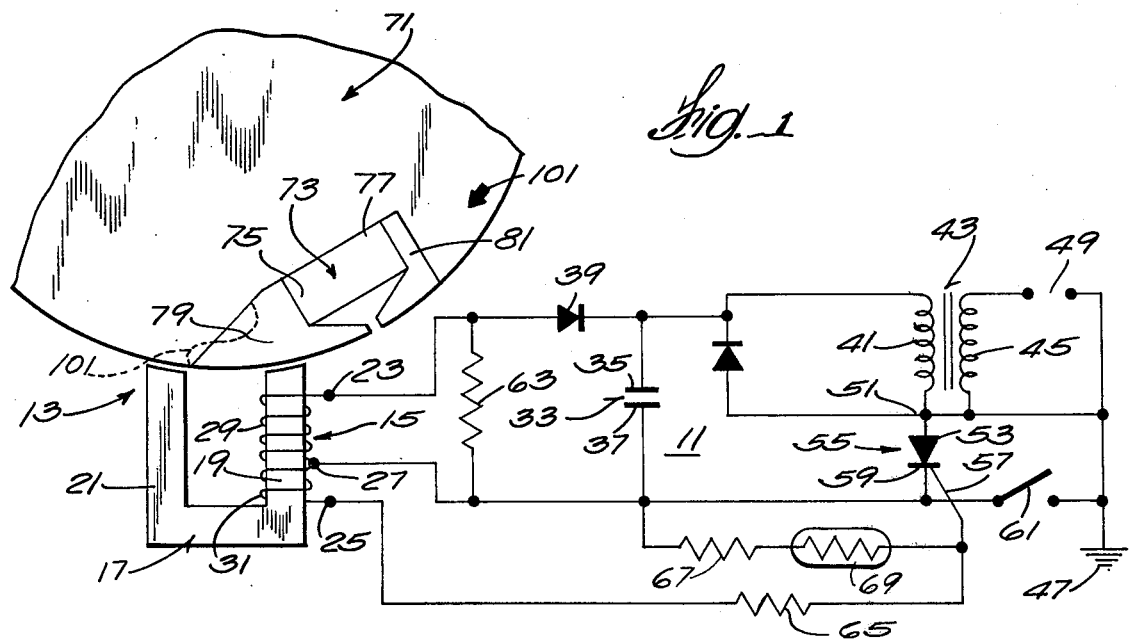
FIG. 1 is a fragmentary schematic view of an engine ignition system embodying various of the features of the invention.

Before explaining the invention in detail, it is to be understood that the invention is not limited in its application to the details of construction and the arrangements of the components set forth in the following description or illustrated in the drawing. The invention is capable of other embodiments and of being practiced and carried out in various ways. Also, it is to be understood that the phraseology and terminology employed herein is for the purposes of description and should not be regarded as limiting.

GENERAL DESCRIPTION

Shown in FIG. 1 of the drawings is an ignition circuit 11 which is charged and triggered by a magneto 13 which incorporates various of the features of the invention.

The magneto 13 includes a coil 15 which is carried by a core 17 including at least a part which is of generally "U" shape and which includes a pair of spaced legs 19 and 21 which can be of any configuration and which have outer ends preferably arranged as shown.

The coil 15 is preferably continuously wound in one direction and includes, in addition to two end terminals 23 and 25, a tap 27 which is located intermediate the end terminals 23 and 25 and which defines two adjacent coil portions 29 and 31. The end terminal 23 and the intermediate tap 27 are connected to a charge capacitor 33 including opposed plates 35 and 37. A blocking diode 39 is employed between the coil terminal 23 and the plate 35 of the capacitor 33 to insure unidirectional flow from the coil 15 to the capacitor 33. Also connected to the capacitor 33 is the primary winding 41 of an ignition coil 43 having a secondary winding 45 which is connected, at one end, to the primary winding 41 and to ground 47 and which is connected, at the other end, to a spark plug 49.

Connected to the juncture 51 of the primary and secondary windings 41 and 45 of the ignition coil 43 is the annode 53 of an SCR or other electronic switch 55, which SCR 55 includes a gate or control terminal 57 and a cathode 59 which is connected to the other plate 37 of the capacitor 33 and to a normally open shut off switch 61 connected to ground 47. The gate 57 is connected to the other end terminal 25 of the coil 15.

If desired, a resistor 63 in shunting relation to the intermediate tap 27 and end terminal 23 of the coil 15 can be employed for transient suppression. In addition, if desired, a resistor 65 can be employed to match the output of the coil portion 31 between the end terminal 25 and intermediate tap 27 with the gate 57 of the SCR 55. Also if desired, resistances 67 and 69 can be employed to reduce circuit temperature dependence.

In accordance with the invention, the magneto 13 is constructed so as to provide automatic spark advance with increasing speed without extension of one or more of the coil core legs 19 and 21 as disclosed in the U.S. Pat. No. 3,667,441, issued June 6, 1972, and so as to prevent reverse engine operation. More specifically, the magneto 13 includes a rotor 71 including a magnet 73 having arcuately spaced first and second poles 75 and 77 together with leading and trailing pole shoes 79 and 81 which are respectively associated with the first and second poles 75 and 77 and which travel past the ends of the legs 19 and 21 of the coil core 17.

The pole shoes 79 and 81 include means cooperating with the legs 19 and 21 for providing automatic spark advance with increase in speed and for preventing reverse rotation. Such means comprises dimensioning the first or leading pole shoe 79 with an arcuate length which is greater than the spacing of the core legs 19 and 21 and which is effective incident to travel of the first or leading pole shoes 79 past the first leg 19 to cause initial flow of flux in one direction into the coil core 17 so as to generate in the coil 15 (See FIG. 3) a first current pulse 91 of one polarity and thereafter to cause outflow of the flux from the coil core 17 so as to generate in the coil 15 a second pulse 93 of the opposite polarity prior to approach of the second or trailing pole shoe 81 to the first core leg 19. In this regard, the second or trailing pole shoe 81 is arcuately spaced from the first or leading pole shoe 79 such that travel of the second pole shoe 81 past the first core leg 19 occurs after generation of the second pulse 93 and is effective to cause inflow of flux of the opposite direction into the coil core 17 so as to generate in the coil 15 a third pulse 95 of the same polarity as the second pulse 93.

Figure 3:
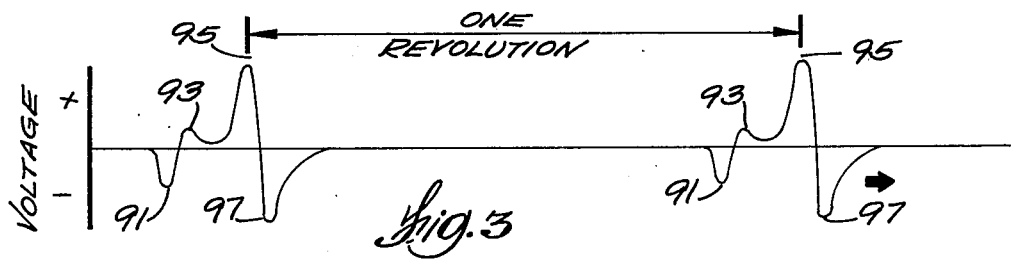
FIG. 3 is a pulse diagram illustrating the sequential generation of pulses by the magneto included in the ignition system shown in FIGS. 1 and 2.

Thus, under normal operating conditions with the rotor 71 rotating in clockwise direction as indicated by the arrow 101 in FIG. 1, travel of the leading pole shoe 79 past the first core leg 19 causes inflow of flux of one direction into the core 17 so as to generate in the coil 15 the pulse 91 which is of one polarity as shown in FIG. 3.

Figure 2:
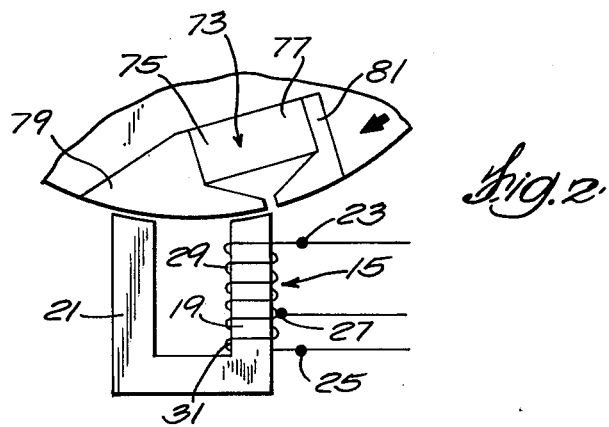
FIG. 2 is a fragmentary view similar to a portion of FIG. 1 illustrating various of the components in a different position.

Continued rotor rotation causes the leading pole shoe 79 to approach the second core leg 21 (as shown in FIG. 1) and thereby to cause outflow or reduction of the flux in the core 17 so as to generate the second pulse 93, which as shown in FIG. 3, is of the opposite polarity. When the gap between the pole shoes 79 and 81 approaches the core leg 19, as shown in FIG. 2, and as the trailing pole shoe 81 travels past the first leg 19, an inflow of flux of the opposite direction occurs in the core 17. As inflow of flux in one direction is equivalent to outflow of flux in the opposite direction, the result is the third pulse 95 (See FIG. 3) which is of the same polarity as the second pulse 93 but which is greater in magnitude.

Subsequently, when the trailing pole shoe 81 travels beyond the first leg 19 and approaches the second leg 21, and as the gap between the pole shoes 79 and 81 travels past the core leg 21, a flux reversal takes place in the core 17, causing the creation of a fourth pulse 97 which is of opposite polarity from the second and third pulses 93 and 95 and which is of the same polarity as the first pulse 91. Travel of the trailing pole shoe 81 beyond the second leg 21 is not effective to create a pulse in the coil 15.

The angular extent of the advance can be varied by varying the length of the first pole shoe 79 relative to the coil core leg spacing so as to increase or decrease the interval during which the first pole shoe 79 is adjacent the ends of both coil core legs 19 and 21.

The magnitude of the pulse 93 can be regulated by tailoring the shape as compared to the length of the pole shoe 79. Thus, if the pole shoe 79 were modified as shown in dotted outline at 101 in FIG. 1 so as to reduce the area available for flux travel and thereby increase reluctance, the magnitude of the pulse 93 would be reduced.

Referring to the circuit 11, when the rotor 71 is rotating in the proper direction, the first pulse 91 is effective, if at all, only to augment the charge already on the capacitor 33 as a consequence of the occurance, in the last cycle, of the fourth pulse 97 and because the first pulse is of the wrong polarity to trigger the SCR 55. The second pulse 93 is insufficient in magnitude to trigger the SCR 55 under low speed conditions and does not affect the charge capacitor 33 because of the blocking diode 39. The third pulse 95 is of sufficient magnitude to trigger the SCR 55 and causes discharge of the capacitor 33 through the primary winding 41 to cause a spark. The fourth pulse 97 serves to charge the capacitor 33 for discharge during the next cycle but it is of the wrong polarity to trigger the SCR 55.

An increase in engine speed will, of course, increase the magnitude of the pulses and consequently the second pulse 93 will increase in magnitude with increase in speed so that, upon a sufficient increase in speed, the magnitude of the second pulse will increase sufficiently to cause triggering of the SCR 55 so as thereby to provide an advanced spark.

Another of the advantages of the invention resides in the capability of the magneto 13 to prevent engine operation in reverse. In this regard, operation in the reverse rotation causes pulse generation in reverse sequence and with opposite polarities from that shown in FIG. 3. Thus, when the rotor 71 is rotating in reverse, the capacitor 33 will be charged first by a pulse corresponding to the pulse 95. Thereafter, a trigger pulse corresponding to pulse 91 will be generated as the pole shoe 79 leaves the leg 19. However, the timing of this trigger pulse is sufficiently retarded so as to effectively prevent engine operation under load.

Another of the advantages of the invention is that the same core structure can be employed for different engines and that the magneto can be tailored to a particular engine by tailoring the rotor structure and by possible changes in the coil winding. However, changes in the coil winding can be easily and economically effected.

Various of the features of the invention are set forth in the following claims.

We claim:

1. A method of operating an internal combustion engine ignition system to permit normal engine operation in a desired direction of rotation and to prevent engine operation in the direction of rotation reverse to the desired direction, which ignition system includes a capacitor adapted to be charged, a switch operative to discharge the capacitor, and relatively rotatable magnet and core parts adapted to charge the capacitor and to operate the switch, the core part having thereon a coil and including first and second legs and the magnet part having arcuately spaced first and second pole shoes with the first pole shoe extending in spaced relation from the second pole shoe in the direction of desired rotation and having an arcuate length which is greater than the spacing of the first and second legs of the core, which method comprises the steps of rotating the magnet and core relative to each other to initially cause inflow of flux in one direction on the core to produce in the coil a first pulse which, when the engine is operating in the desired direction, is of the polarity which is ineffective to operate the switch and which, when the engine is operated in the reverse direction, is of the other polarity and of sufficient magnitude to operate the switch to discharge the capacitor so far in advance of top dead center so as to preclude continued reverse engine rotation, to thereafter cause outflow of flux in the opposite direction from the core to produce in the coil a second pulse which, when the engine is operating in the desired direction, is of the opposite polarity and of insufficient magnitude to operate the switch to cause discharge of the capacitor when the engine is operating at slow speed and of sufficient magnitude to operate the switch to discharge the capacitor when the engine is operating at high speed, to thereafter cause inflow of flux into the core so as to produce in the coil a third pulse which, when the engine is operating in the desired direction, is of the opposite polarity and is effective to operate the switch to discharge the capacitor when the engine is operating at slow speed, and to thereafter cause reversal of flux flow so as to produce in the coil a fourth pulse which, when the engine is operating in the desired direction, is of the polarity which is ineffective to operate the switch and which can be employed to charge the capacitor.

* * * * *